United States Patent [19]

Kamigaki et al.

[11] Patent Number: 5,035,960
[45] Date of Patent: Jul. 30, 1991

[54] MAGNETIC RECORDING MEDIUM FOR MAGNETIC ENCODER

[75] Inventors: Tomoo Kamigaki; Ichiro Tokunaga, both of Furukawa; Satoshi Yanagita, Isehara; Koro Hayasaka, Tokyo, all of Japan

[73] Assignee: Alps Electric Co., Ltd., Tokyo, Japan

[21] Appl. No.: 219,026

[22] Filed: Jul. 14, 1988

[30] Foreign Application Priority Data

Jul. 24, 1987 [JP] Japan .................. 62-184913

[51] Int. Cl.⁵ .............................. G11B 23/00
[52] U.S. Cl. ............................ 428/694; 428/900
[58] Field of Search ............ 428/694, 900; 204/35.1

[56] References Cited

U.S. PATENT DOCUMENTS 4,548,682 10/1985 Yoshida et al. ............... 204/35.1
4,563,397 1/1986 Ishiguro et al. ............... 428/469
4,650,708 3/1987 Takahashi .

FOREIGN PATENT DOCUMENTS 52-94104 8/1977 Japan .

OTHER PUBLICATIONS

Article Entitled: Magnetic Properties of Anodic Oxide Coatings on Aluminum Containing Electrodeposited Co and Co—Ni, by Satoshi Kawai and Ryuzu Ueda, vol. 122, No. 1, J. Electrochem. Soc.: Electrochemical Science and Technology, Jan. 1975, pp. 32–36.

Primary Examiner—Paul J. Thibodeau
Attorney, Agent, or Firm—Guy W. Shoup; David H. Carroll; B. Noël Kivlin

[57] ABSTRACT

A magnetic recording medium for a magnetic encoder which has an alumite magnetic film that magnetic metal is precipitated in pores of porous aluminum oxide film so that the diameter of the pore is 80 to 200 Angstroms and the depth thereof is 3 to 100 microns. Thus, the magnetic recording medium can magnetically record in a high density and can be fabricated inexpensively.

5 Claims, 2 Drawing Sheets

MAGNETIC RECORDING MEDIUM FOR MAGNETIC ENCODER

BACKGROUND OF THE INVENTION

1. Field of the Invention

This invention relates to a magnetic recording medium adapted for an encoder used to detect an angle, a rotating speed or a position.

2. Description of the Prior Art

Heretofore, a conventional magnetic recording medium used for a magnetic encoder has been made of a plastic magnet.

However, the magnetic recording density of the magnetic recording medium made of the plastic magnet cannot be enhanced, and such magnetic recording medium does not satisfy the accuracy requirements of the encoder.

In order to eliminate the drawbacks, there is proposed a magnetic recording medium made of iron-cobalt-chromium alloy magnet adapted for a vertical magnetic recording system.

However, since the magnetic recording medium made of this alloy magnet must be heat treated in a strong magnetic field at the time of fabrication, its manufacturing cost is high.

A sputtered film of a cobalt alloy or an electroless plating film is proposed as a vertical recording medium, but both have low coercive force, and cannot be used for a magnetic encoder.

Further, as shown in FIG. 3, it is also difficult to form a medium on the circumferential portion of a drum.

SUMMARY OF THE INVENTION

Accordingly, an object of this invention is to provide a magnetic recording medium for a magnetic encoder which can eliminate the above-described drawbacks of the prior art and which can magnetically record at a high density and can be fabricated inexpensively.

In order to achieve the above and other objects of the invention, there is provided according to the present invention a magnetic recording medium for a magnetic encoder comprising an alumite magnetic film having pores, each of said pores having a diameter in the range of 80 to 200 Angstroms and a depth in the range of 10 to 100 microns.

The above and other related objects and features of the invention will be apparent from the following description of the disclosure and the accompanying drawings.

DESCRIPTION OF THE PREFERRED EMBODIMENTS

The coercive force of the magnetic recording medium for the magnetic encoder preferably is in the range of 2000±500 Oe. If the coercive force is less than 1500 Oe, the magnetic recording can be easily erased by an external magnetic field, while if it exceeds 2500 Oe, the recording medium is hard to magnetize.

Figure 1:
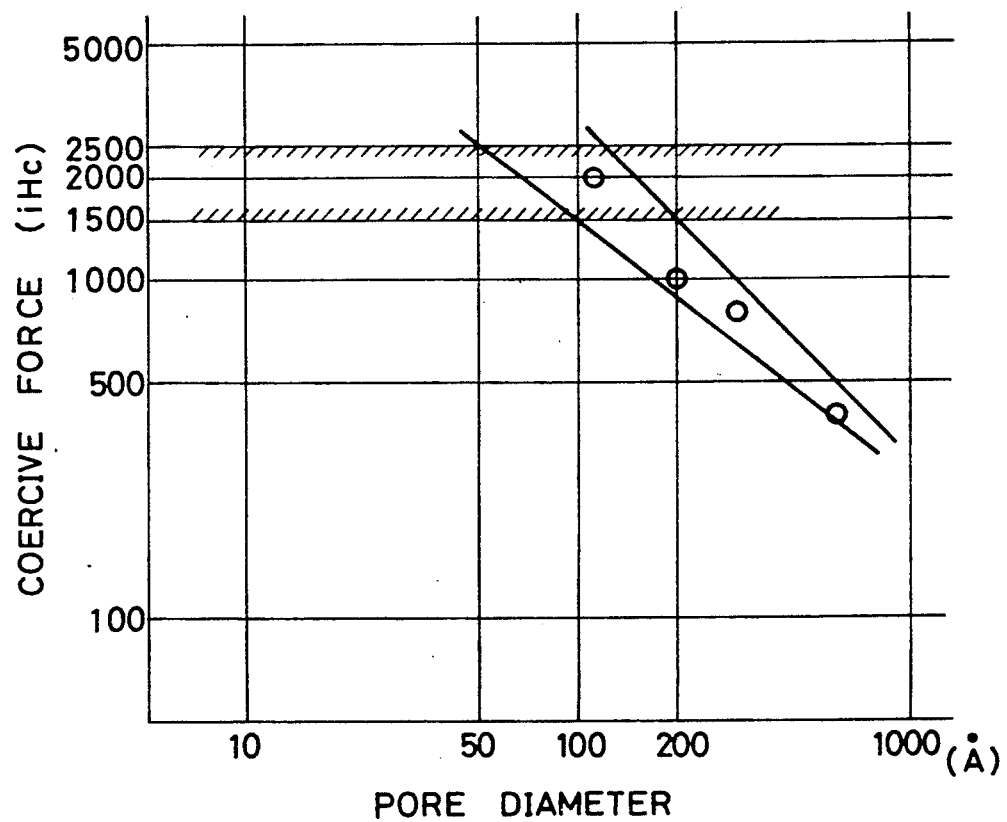
FIG. 1 is a graph showing the relationship between the pore diameter and the coercive force of an alumite magnetic film when iron is used for a magnetic metal.
Figure 2:
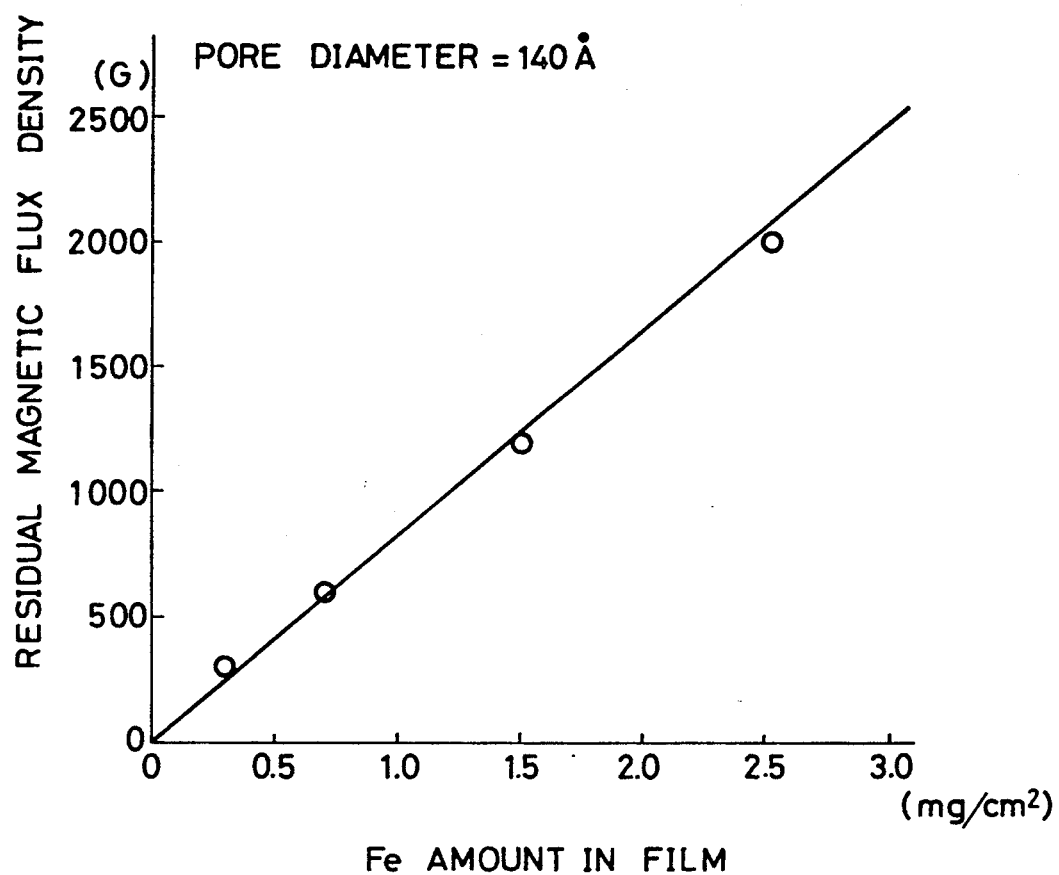
FIG. 2 is a graph showing the relationship between the filling magnetic metal amount and the remaining magnetic flux density.

The present inventors have studied the alumite magnetic film used only for a stationary disk having a small coercive force to be written and erased. As a result, it is known that a high correlation as shown in FIG. 1 exists between the coercive force and the pore diameter in the alumite magnetic film, and it is discovered that, when a necessary magnetic metal amount is deposited in the film pores of a small diameter as shown in FIG. 2, its energy product is increased to achieve the object of the invention.

More specifically, if the pore diameter becomes less than 50 Angstroms, the coercive force of the recording medium becomes so large as to make the medium difficult to magnetize, while if the pore diameter exceeds 200 Angstroms, the coercive force of the recording medium becomes too small, and the magnetic recording can be too easily erased for an encoder. In other words, if the pore diameter is not in the above-mentioned range, the coercive force of the recording medium cannot be set within a proper range as shown in FIG. 1 (between shaded lines).

In addition, if the pore diameter becomes less than 80 Angstroms, it becomes difficult to precipitate a sufficient amount of magnetic metal in the pores.

The depth of the pore of the alumite magnetic film of the magnetic recording medium of the invention is preferably set within 3 to 100 microns and more preferably 10 to 50 microns.

According to the inventors' studies, the depth of the pore relates to the magnetic density of the magnetic recording medium. In the magnetic recording medium for the magnetic encoder, it is necessary to leak a magnetic flux to operate a magnetoelectric transducer, such as an MR sensor or a Hall element. To this end, magnetic metal in the amount of 0.5 mg and preferably 1 to 3 mg per 1 $cm^2$ must be deposited, and the pore depth is desired to be 10 microns or more. If the pore becomes deeper, it becomes harder to precipitate the magnetic metal electrolytically in the pores. If the pore depth exceeds 80 microns, the electrolytic precipitation cannot be economically conducted, and if the pore depth exceeds 100 microns, the magnetic metal is extremely difficult to precipitate.

It is preferable to select the magnetic metal to be deposited in the pores of the alumite magnetic film to form the magnetic recording medium of the invention from iron, cobalt, nickel and their alloys. Among them, the iron is most preferable due to its large saturable magnetization.

The magnetic recording medium of the invention of high coercive force and high remaining magnetic flux density can be formed in ordinary alumite and plating steps.

Since it is not necessary to treat it in a magnetic field at the time of fabrication, the manufacturing cost can be greatly reduced.

Figure 3:
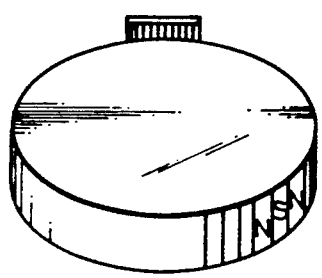
FIG. 3 is a perspective view showing an example of a magnetic recording medium of the invention.

Further, as shown in FIG. 3, it is easy to form the medium on the periphery of a drum.

An embodiment of a magnetic recording medium for a magnetic encoder and a conventional magnetic recording medium in comparison were manufactured as below and the characteristics were examined.

High purity aluminum disks having 25.5 mm in diameter were manufactured, and dipped in 5%-sodium hydroxide solution at 80° C. for 20 sec. to be alkali-etched.

Then, the aluminum disks were dipped in 6%-nitric acid solution at 20° C. for one minute to be neutralized.

Thereafter, the aluminum disks were dipped in 15%-sulfuric acid solution at 20° C. to be subjected to anodic oxidation. The treating times and applied voltages were as listed in Table 1. They were different for different aluminum disks.

Then, the aluminum disks which were subjected to the anodic oxidation were dipped in 10%-phosphoric acid solution at 25° C., a constant-voltage of 15 V was applied thereto to increase the pore diameter. The treating times are listed in Table 1. Thereafter, an electrolysis was conducted at the anode side to adjust a barrier layer.

Subsequently, magnetic metals (iron, cobalt, nickel and iron-nickel alloy) were precipitated by AC electrolytic plating in the pores of aluminum oxide porous film (alumite film) formed as described above. The composition and the plating time of the plating solution are listed in Table 1.

Then the aluminum disks were dipped in pure water at 80° C. for 10 min to seal the pores, then polished by a polishing paper #200, and magnetized at 80 micron pitch by a vertical magnetic recording system using a ring head at the periphery of the disk, thereby obtaining magnetic recording medium as shown in FIG. 3.

Since the alumite magnetic film is filled with magnetic metal vertically, its vertical anisotropy is high. Therefore, the magnetic recording medium of the invention can magnetically record in a vertical magnetic recording system to provide an advantage of sufficiently enhancing the recording density.

Then, the pore depth, diameter, the coercive force, and the reading sensitivity of a magnetoelectric transducer (MR sensor) of the magnetic recording medium fabricated as described above were examined.

The results are listed in Table 1.

From the results in Table 1, the magnetic recording medium having 80 to 200 Angstroms in the pore diameter, 3 to 100 microns in the pore depth is confirmed to have a magnetic flux of coercive force of 2500 to 1500 Oe which is a proper range for the magnetic encoder.

Since the sample No. 1 has an excessively small pore diameter, the sample No. 7 has excessively deep depth, iron was presumed not to be precipitated.

According to the magnetic recording medium for the magnetic encoder of the present invention as described above, the pore diameter of the alumite magnetic film is 80 to 200 Angstroms, the pore depth is 3 to 100 microns, and magnetic metal having a weight of 0.5 mg per 1 $cm^2$ is provided. Therefore, the magnetic recording medium of the invention has the coercive force and leakage magnetic flux in a range optimum for the magnetic encoder.

The magnetic recording medium of the invention uses ordinary alumite and plating step, inexpensive metal, and further eliminates the treatment in the magnetic field at the time of fabrication. Therefore, the manufacturing cost can be greatly reduced.

Further, since the magnetic recording medium of the invention can be magnetically recorded in a vertical magnetic recording system, the recording density can be sufficiently enhanced.

TABLE 1

| Sample No. | Composition of plating solution | Anodic Oxidaton Time Applied Voltage | Pore increasing time | Plating time |
|---|---|---|---|---|
| 1 | 8% FeSo + 3% $H_3BO_3$ | 60 min. (10 V) | 0 min. | # |
| 2 | " | 60 min. (15 V) | " | 30 min. |
| 3 | " | " | 2 min. | " |
| 4 | " | " | 4 min. | " |
| 5 | " | " | 6 min. | " |
| 6 | " | 120 min. (15→25 V) | 2 min. | 60 min. |
| 7 | " | 360 min. (15→30 V) | " | # |
| 8 | " | 15 min. (15 V) | " | 7 min. |
| 9 | " | 30 min. (15 V) | " | 15 min. |
| 10 | 8% $NiSO_4$ + 3% $H_3BO_3$ | 120 min. (15→25 V) | " | 60 min. |
| 11 | 8% $CoSO_4$ + 3% $H_3BO_3$ | " | " | " |
| 12 | 6.8% $NiSO_4$ + 1.2% $FeSO_4$ + 3% $H_3BO_3$ | " | " | " |

| Sample No. | Pore Depth | #1 Pore dia. | #2 Coercive force | #2 Remaining mag. flux | #3 Fe amount (mg/cm) | #4 Reading |
|---|---|---|---|---|---|---|
| 1 | 15 μm | 70Å | — | — | — | x |
| 2 | 20 μm | 100Å | 2500 Oe | 600 G | 1.0 | Δ |
| 3 | " | 140Å | 1800 Oe | 1200 G | 1.5 | ○ |
| 4 | " | 180Å | 1500 Oe | 1000 G | 1.7 | ○ |
| 5 | " | 250Å | 1200 Oe | 300 G | 1.7 | x |
| 6 | 38 μm | 140Å | 1800 Oe | 2000 G | 2.5 | ○ |
| 7 | 110 μm | " | — | — | — | x |
| 8 | 5 μm | " | 2000 Oe | 300 G | 0.3 | x |
| 9 | 10 μm | " | 1800 Oe | 600 G | 0.7 | Δ |
| 10 | 38 μm | " | 1500 Oe | 800 G | — | ○ |
| 11 | " | " | 1600 Oe | 800 G | — | ○ |
| 12 | " | " | 1700 Oe | 900 G G | — | ○ |

1: Alumite magnetic film was etched with mixed acid of phosphoric acid-chromic acid, removed acicular powder ws observed and measured by scan electron microscope (SEM).
2: Measured by vibration sample magnetometer (VSM).
3: Chemical analysis by ICP.
4: Magnetized by ring head at pitch of 80 microns, and measured at 40 microns of cap by MR sensor. Evaluation was executed with Vpp value of reproduction signal at 5 V applied, "○" 40 mV or higher, "x" 20 mV or lower.
Fe not precipitated.

What is claimed is:

1. A magnetic recording medium for a magnetic encoder comprising:

an alumite magnetic film having pores, each of said pores having a diameter in the range of about 80 to 200 Angstroms and a depth in the range of about 10 to 100 microns; and precipitated magnetic metal contained in said pores in an amount of 0.5 mg or more per/cm2, said magnetic metal being selected from the group consisting of iron, cobalt nickel, and their alloys.

2. A magnetic recording medium according to claim 1, wherein the weight of said magnetic metal is approximately from 1 to 3 mg per 1 cm$^2$.

3. A magnetic recording medium according to claim 1, wherein:

the weight of said magnetic metal is at least about 0.7 mg per 1 cm$^2$.

4. A magnetic recording medium for use in a vertical magnetic recording system, comprising:

a drum;

a porous aluminum oxide film on a peripheral surface of said drum, pores of said film extending perpendicularly to said surface, said pores having a diameter in the range of about 80 to 200 Angstroms and a depth in the range of about 10 to 100 microns and containing at least 0.5 mg per cm$^2$ of precipitated magnetic metal, wherein a vertical anisotropy is achieved.

5. A magnetic encoder according to claim 1, wherein said metal is selected from the group consisting of iron, cobalt, nickel and their alloys.

* * * * *

UNITED STATES PATENT AND TRADEMARK OFFICE
CERTIFICATE OF CORRECTION

PATENT NO.    :   5,035,960
DATED         :   July 30, 1991
INVENTOR(S)   :   Kamigaki et al.

It is certified that error appears in the above-identified patent and that said Letters Patent is hereby corrected as shown below:

Column 6, line 12 "claim 1" should be --claim 4--.

Signed and Sealed this

Fifth Day of January, 1993

Attest:

DOUGLAS B. COMER

Attesting Officer

Acting Commissioner of Patents and Trademarks